United States Patent
Liu et al.

(10) Patent No.: US 11,945,945 B2
(45) Date of Patent: Apr. 2, 2024

(54) RESIN HAVING A CATALYST FOR REACTIVE ADHESION TO A POLYESTER

(71) Applicants: Dow Global Technologies LLC, Midland, MI (US); Regents of the University of Minnesota, Minneapolis, MN (US)

(72) Inventors: Kunwei Liu, Maplewood, MN (US); Alex Michael Jordan, Menomonie, WI (US); Christopher John Ellison, Eden Prairie, MN (US); Christopher Ward Macosko, Minneapolis, MN (US); Christopher M. Thurber, Midland, MI (US); Wenyi Huang, Midland, MI (US); Thomas H. Peterson, Midland, MI (US)

(73) Assignees: Dow Global Technologies LLC, Midland, MI (US); Regents of The University of Minnesota, Minneapolis, MN (US)

( * ) Notice: Subject to any disclaimer, the term of this patent is extended or adjusted under 35 U.S.C. 154(b) by 687 days.

(21) Appl. No.: 17/057,248

(22) PCT Filed: May 22, 2019

(86) PCT No.: PCT/US2019/033565
§ 371 (c)(1),
(2) Date: Nov. 20, 2020

(87) PCT Pub. No.: WO2019/226797
PCT Pub. Date: Nov. 28, 2019

(65) Prior Publication Data
US 2021/0269633 A1    Sep. 2, 2021

Related U.S. Application Data

(60) Provisional application No. 62/674,953, filed on May 22, 2018.

(51) Int. Cl.
| | |
|---|---|
| *C08L 51/06* | (2006.01) |
| *B32B 27/08* | (2006.01) |
| *B32B 27/18* | (2006.01) |
| *B32B 27/32* | (2006.01) |
| *B32B 27/36* | (2006.01) |
| *C08F 222/06* | (2006.01) |
| *C08G 63/183* | (2006.01) |
| *C08K 5/57* | (2006.01) |

(Continued)

(52) U.S. Cl.
CPC .............. *C08L 51/06* (2013.01); *B32B 27/08* (2013.01); *B32B 27/18* (2013.01); *B32B 27/32* (2013.01); *B32B 27/36* (2013.01); *C08F 222/06* (2013.01); *C08G 63/183* (2013.01); *C08K 5/57* (2013.01); *C08L 23/06* (2013.01); *C08L 23/0815* (2013.01); *B32B 2250/02* (2013.01); *B32B 2250/24* (2013.01); *B32B 2323/046* (2013.01); *B32B 2367/00* (2013.01); *B32B 2439/46* (2013.01); *C08L 2203/162* (2013.01); *C08L 2205/025* (2013.01); *C08L 2207/062* (2013.01); *C08L 2207/066* (2013.01)

(58) Field of Classification Search
CPC ...... C08L 51/06; C08L 23/06; C08L 23/0815; C08L 2203/162; C08L 2205/025; C08L 2207/062; C08L 2207/066; B32B 27/08; B32B 27/18; B32B 27/36; B32B 2250/02; B32B 2250/24; B32B 2323/046; B32B 2367/00; B32B 2439/46; C08F 222/06; C08G 63/18; C08K 5/57
USPC ....................................... 524/504
See application file for complete search history.

(56) References Cited

U.S. PATENT DOCUMENTS

| 4,370,388 A | 1/1983 | Mito et al. |
|---|---|---|
| 5,599,881 A | 2/1997 | Xie |

(Continued)

FOREIGN PATENT DOCUMENTS

| CN | 106566045 | 4/2017 |
|---|---|---|
| CN | 106566045 A | 4/2017 |

(Continued)

OTHER PUBLICATIONS

International Search Report & Written Opinion for related PCT Application PCT/US2019/033565, dated Jul. 31, 2019 (11 pgs).

(Continued)

*Primary Examiner* — Hannah J Pak
(74) *Attorney, Agent, or Firm* — Brooks, Cameron & Huebsch, PLLC

(57) ABSTRACT

A resin including up to 99.99 weight percent (wt. %) of a first polyolefin grafted with a functional group selected from an ethylenically unsaturated carboxylic acid, a carboxylic acid anhydride, an ester functional group or a combination thereof; and 0.01 to 3.0 wt. % of a tin oxide-based catalyst, where the resin includes 0.2 wt. % to 1.5 wt. % of the functional group from the first polyolefin, the wt. % based on a total weight of the resin. The first polyolefin can be selected from a polyethylene, a polypropylene, an ethylene/alpha-olefin copolymer, a propylene/alpha-olefin copolymer and combinations thereof. The tin oxide-based catalyst can be selected from dibutyltin oxide, dioctyltin oxide and combinations thereof. The resin can be used in a multilayer structure, where a Layer A comprises the resin and a Layer B comprises a polyester, where a first major surface of Layer A is in adhering contact with the second major surface of Layer B.

16 Claims, 12 Drawing Sheets

(51) Int. Cl.
C08L 23/06 (2006.01)
C08L 23/08 (2006.01)

(56) References Cited

U.S. PATENT DOCUMENTS

| | | | | |
|---|---|---|---|---|
| 6,037,063 | A | * | 3/2000 | Muschiatti ............... C08L 67/02 428/483 |
| 8,475,933 | B2 | | 7/2013 | Patel et al. |
| 2005/0227087 | A1 | | 10/2005 | Burgmeier et al. |
| 2010/0143651 | A1 | * | 6/2010 | Silvis .................. C08L 23/0815 36/98 |
| 2012/0136082 | A1 | * | 5/2012 | Daiss .................... C08F 255/00 526/279 |
| 2013/0338316 | A1 | | 12/2013 | Silvis et al. |
| 2017/0198103 | A1 | | 7/2017 | Lee |

FOREIGN PATENT DOCUMENTS

| | | |
|---|---|---|
| CN | 106800696 | 6/2017 |
| CN | 106800696 A | 6/2017 |
| JP | S52043824 A | 11/1978 |
| JP | S52077155 A | 1/1979 |
| JP | H08291281 A | 11/1996 |
| WO | 2017053221 | 3/2017 |

OTHER PUBLICATIONS

Legros, et al., "Reactive Compatibilization of Polyester/Vinyl Acetate Copolymer Blends: Rheological, Morphological and Mechanical Properties"; Polymer, vol. 35, No. 4 (1994) (7 pgs).
Shah, et al., "Catalytic Conversion of Jojoba Oil Into Biodiesel by Organotin Catalysts, Spectroscopic and Chromatographic Characterization"; Fuel, vol. 118 (2014) (6 pgs).
Thurber, et al. "Accelarating Reactive Compatibilization of PE/PLA Blends by an Interfacially Localized Catalyst"; ACS Macro Letters, vol. 4 (2014) (4 pgs).
Thurber, et al., "Toughening Polylactide With a Catalyzed Epoxy-Acid Interfacial Reaction"; Polymer Engineering and Science, vol. 58 (2017) (9 pgs).
International Preliminary Report on Patentability for related PCT Application PCT/US2019/033565, dated Dec. 3, 2020 (7 pgs).

* cited by examiner

RESIN HAVING A CATALYST FOR REACTIVE ADHESION TO A POLYESTER

This application is a National Stage Application under 35 U.S.C. § 371 of International Application Number PCT/US2019/033565, filed May 22, 2019 and published as WO 2019/226797 on Nov. 28, 2019, which claims the benefit to U.S. Provisional Application 62/674,953, filed May 22, 2018, the entire contents of which are incorporated herein by reference in its entirety

TECHNICAL FIELD

The present disclosure relates generally to a resin and more particularly to a resin having a catalyst for reactive adhesion to a polyester.

BACKGROUND

Polyester films, such as polyethylene terephthalate (PET) films, are widely used in packaging for their aesthetics and physical properties such as high gloss, clarity, barrier and rigidity properties. However, PET films lack sealing properties due to their relative high melting temperature. Therefore, it is a common practice to form packaging films having PET as a backing film with a laminated sealant layer, such as a polyethylene (PE) sealant film. PET, however, is a material well known for its poor adhesion to other polymers such as PE. So, achieving good adhesion between PET (or its derivatives such as polyethylene terephthalate glycol (PET-g) among others), with a sealant film (e.g., a PE sealant film) in coextrusion or extrusion lamination processes is a challenge in the packaging world.

One approach to improving the adhesion of polymer films to a PET film has been to use a primer during the coextrusion or extrusion lamination process. Among the issues, however, is drying the primer solution on the PET film can adversely affect the output of the process and adds costly manufacturing steps. Additionally, some primers are not environmentally friendly.

Another approach in trying to improve adhesion of polymer films to PET films during the coextrusion or extrusion lamination process is to use a resin as a "tie-layer." Examples of resins for use as "tie-layers" include BYNEL®, LOTADER®, AMPLIFY®, ADMER™. These resins, however, are not effective in improving adhesion between PET and other polymer films (e.g., PE films). One theory regarding this is that the absence of a nucleophilic partner along the polyester backbone leaves only low concentration end groups as potentially reactive moieties. Consequently, coronal treatment and/or primers (e.g. poly(ethyleneimine)) have been used on PET films in attempting to improve adhesion. This strategy, however, cannot be extended to oriented film structures where adhesive failure is often observed.

As such, there continues to be a need for resins that can help improve polymer-polymer coupling between a polyolefin (e.g., PE films) and a polyester (e.g., PET films) during coextrusion or extrusion lamination.

SUMMARY

The present disclosure relates to a resin with excellent adhesion to polyesters, such as polyethylene terephthalate (PET). The resin of the present disclosure comprises a first polyolefin grafted with a functional group selected from an ethylenically unsaturated carboxylic acid, a carboxylic acid anhydride, an ester functional group or a combination thereof, and a tin oxide-based catalyst. The resin of the present disclosure shows improvements in polymer-polymer coupling between a polyolefin and a polyester during coextrusion or extrusion lamination.

The resin of the present disclosure includes up to 99.99 weight percent (wt. %) of a first polyolefin grafted with a functional group selected from an ethylenically unsaturated carboxylic acid, a carboxylic acid anhydride, an ester functional group or a combination thereof, and 0.01 to 3.0 wt. % of a tin oxide-based catalyst, where the resin includes 0.2 wt. % to 1.5 wt. % of the functional group from the first polyolefin, where the wt. % is based on a total weight of the resin. For the various embodiments, the tin oxide-based catalyst is selected from the group consisting of dibutyltin oxide, dioctyltin oxide and combinations thereof. In a preferred embodiment, the tin oxide-based catalyst is dioctyltin oxide.

For the various embodiments, the first polyolefin is selected from the group consisting of a polyethylene, a polypropylene, an ethylene/alpha-olefin copolymer, a propylene/alpha-olefin copolymer and combinations thereof. For example, the first polyolefin is a random ethylene/alpha-olefin copolymer grafted with maleic anhydride, where the random ethylene/alpha-olefin copolymer grafted with maleic anhydride has a grafted maleic anhydride level of 0.05 to 3.0 wt. % maleic anhydride based on the total weight of the random ethylene/alpha-olefin copolymer grafted with maleic anhydride. In another embodiment, the first polyolefin can be a polyethylene grafted with maleic anhydride, where the polyethylene grafted with maleic anhydride has a grafted maleic anhydride level of 0.05 to 3.0 wt. % maleic anhydride based on the total weight of the polyethylene grafted with maleic anhydride. For such an embodiment, the polyethylene grafted with maleic anhydride is selected from a group consisting of a high-density polyethylene, a medium density polyethylene, linear low-density polyethylene, a low-density polyethylene, an ethylene/alpha-olefin copolymer having a density of 0.855 g/cm$^3$ to 0.970 g/cm$^3$ and combinations thereof. For any of the various embodiments, the grafted maleic anhydride level can be 0.20 to 1.0 wt. % maleic anhydride.

Embodiments of the present disclosure also include the resin having 0.4 to 0.8 wt. % of the tin oxide-based catalyst and the resin having 0.5 to 1.5 wt. % of the functional group from the first polyolefin. Embodiments of the present disclosure further include the resin having 0.4 to 0.8 wt. % of the tin oxide-based catalyst and the resin having 1.0 to 1.5 wt. % of the functional group from the first polyolefin. Embodiments of the present disclosure also include the resin having 0.8 wt. % of the tin oxide-based catalyst and the resin having 1.0 to 1.5 wt. % of the functional group from the first polyolefin.

The resin of the present disclosure can also include a second polyolefin having a density of 0.855 to 0.970 g/cm$^3$, where the resin includes greater than 0 to 80 wt. % of the second polyolefin based on the total weight of the resin and the total weight of the first polyolefin, and the second polyolefin is different than the first polyolefin. For the various embodiments, the second polyolefin is selected from a group consisting of a high-density polyethylene, a medium density polyethylene, linear low-density polyethylene, a low-density polyethylene, an ethylene/alpha-olefin copolymer having a density of 0.855 g/cm$^3$ to 0.970 g/cm$^3$ and combinations thereof.

The resin of the present disclosure can further include 5 to 95 wt. % of a polyester based on the total weight of the resin. For such embodiments, the polyester is selected from the group consisting of polyethylene terephthalate (PET), polybutylene terephthalate (PBT), PET-glycol (PET-g), a PET copolymer, polylactic acid and combinations thereof. Copolymers of PET include, but are not limited to, those formed with isophthalic acid and/or cyclohexane dimethanol. For the various embodiments, the polyester can have a viscosity within one order of magnitude of a viscosity of the first polyolefin, where the viscosity is measured according to ASTM D4440.

The present disclosure also includes a multilayer structure comprising at least two layers arranged in order Layer A/Layer B, where each of the at least two layers has a first major surface and a second major surface opposite the first major surface. Layer A comprises the resin as described herein, and Layer B comprises a polyester, where a first major surface of Layer A is in adhering contact with the second major surface of Layer B. The polyester of Layer B is selected from the group consisting of a film of polyethylene terephthalate (PET), polybutylene terephthalate (PBT), PET-glycol (PET-g), a PET copolymer, polylactic acid and combinations thereof. The copolymers of PET include, but are not limited to, those formed with isophthalic acid and/or cyclohexane dimethanol, which are possible polyesters for use as Layer B in the multilayer structure of the present disclosure.

The multilayer structure as provided herein can be used to form a package. In other words, a package is formed with the multilayer structure of the present disclosure. Similarly, a multilayer structure as provided herein can be used to form a laminate. In other words, a laminate is formed with the multilayer structure of the present disclosure. A structural panel formed using the multilayer structure of the present disclosure is also possible.

DETAILED DESCRIPTION

Figure 1:
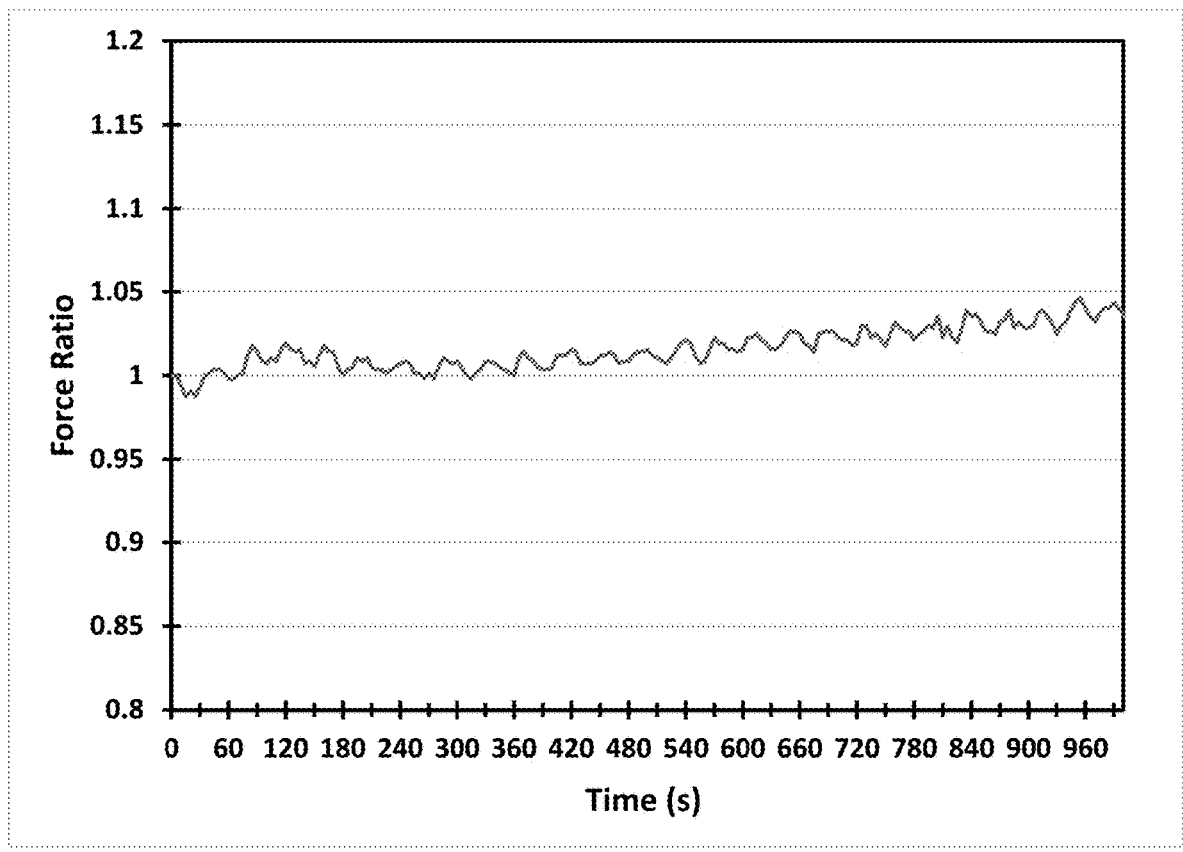
FIG. 1 provides force ratio values as a function of time for Comparative Example A as seen in Table 2.
Figure 2:
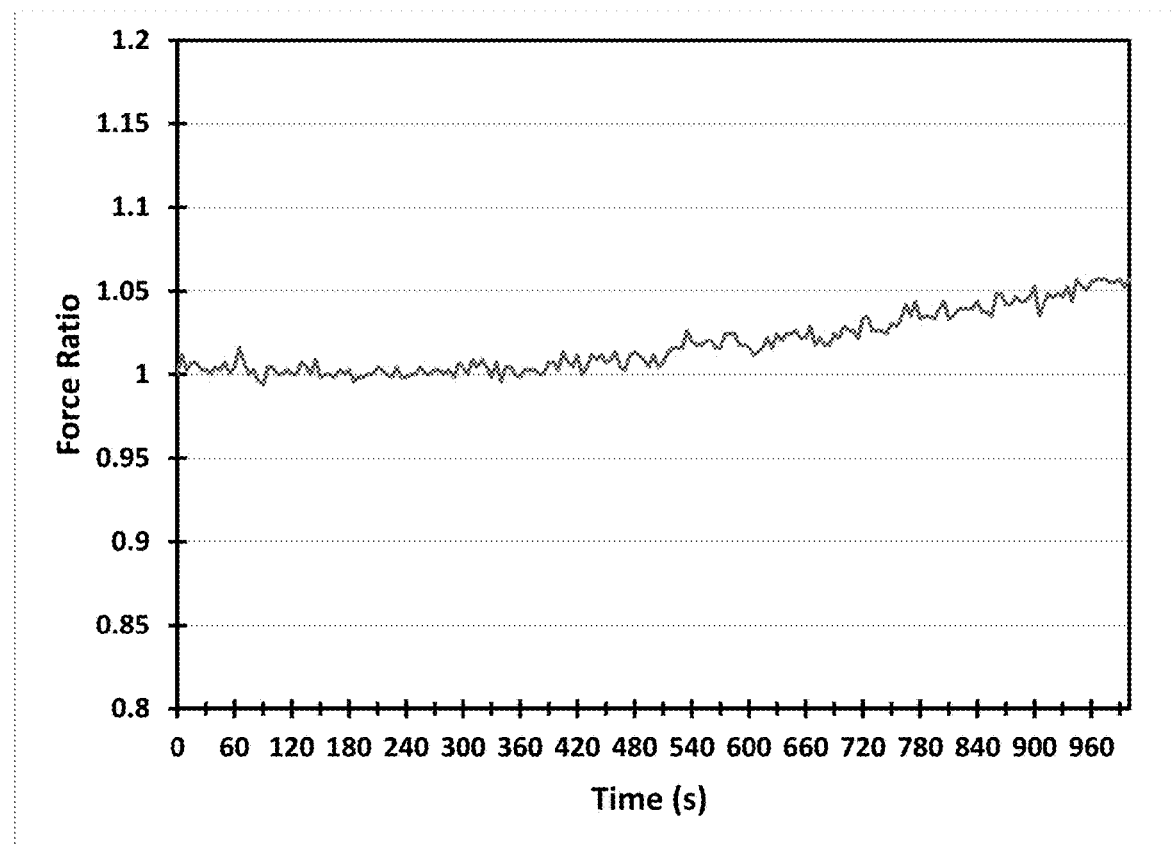
FIG. 2 provides force ratio values as a function of time for Comparative Example B as seen in Table 2.
Figure 3:
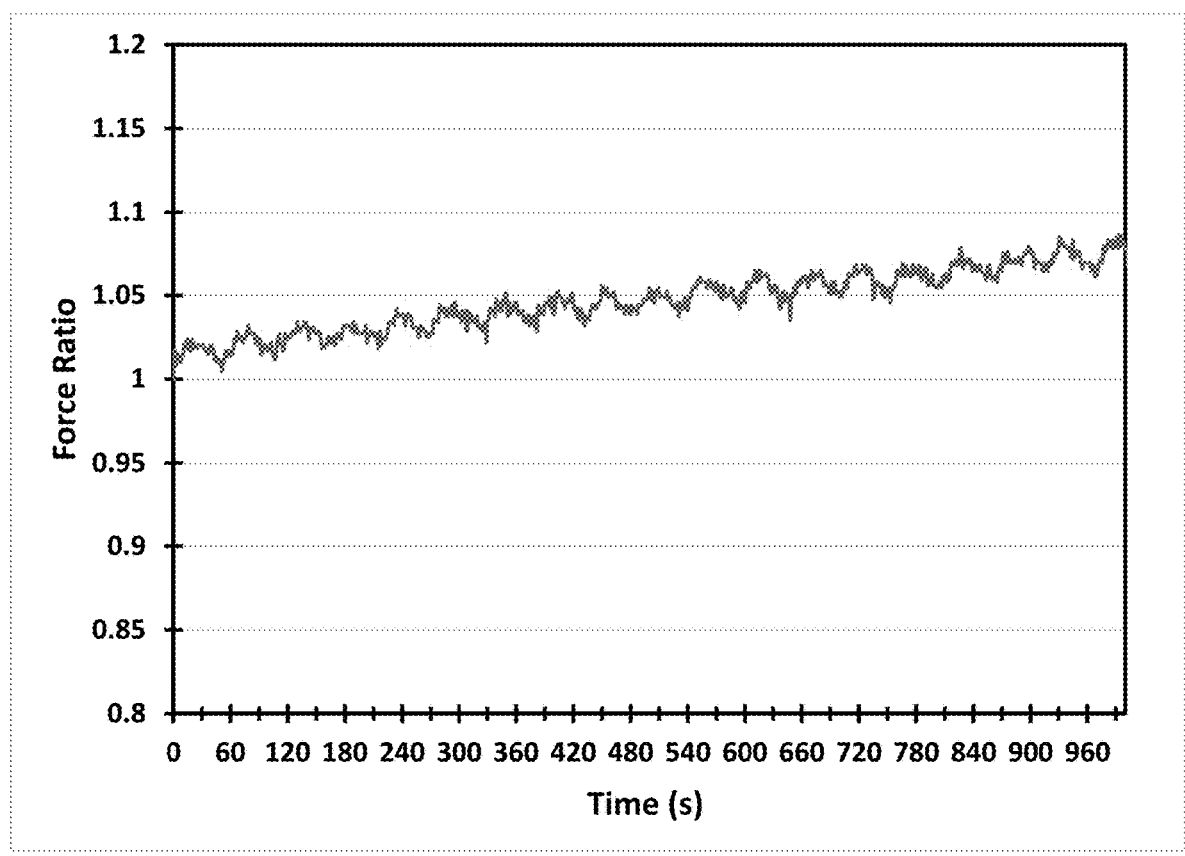
FIG. 3 provides force ratio values as a function of time for Comparative Example C as seen in Table 2.
Figure 4:
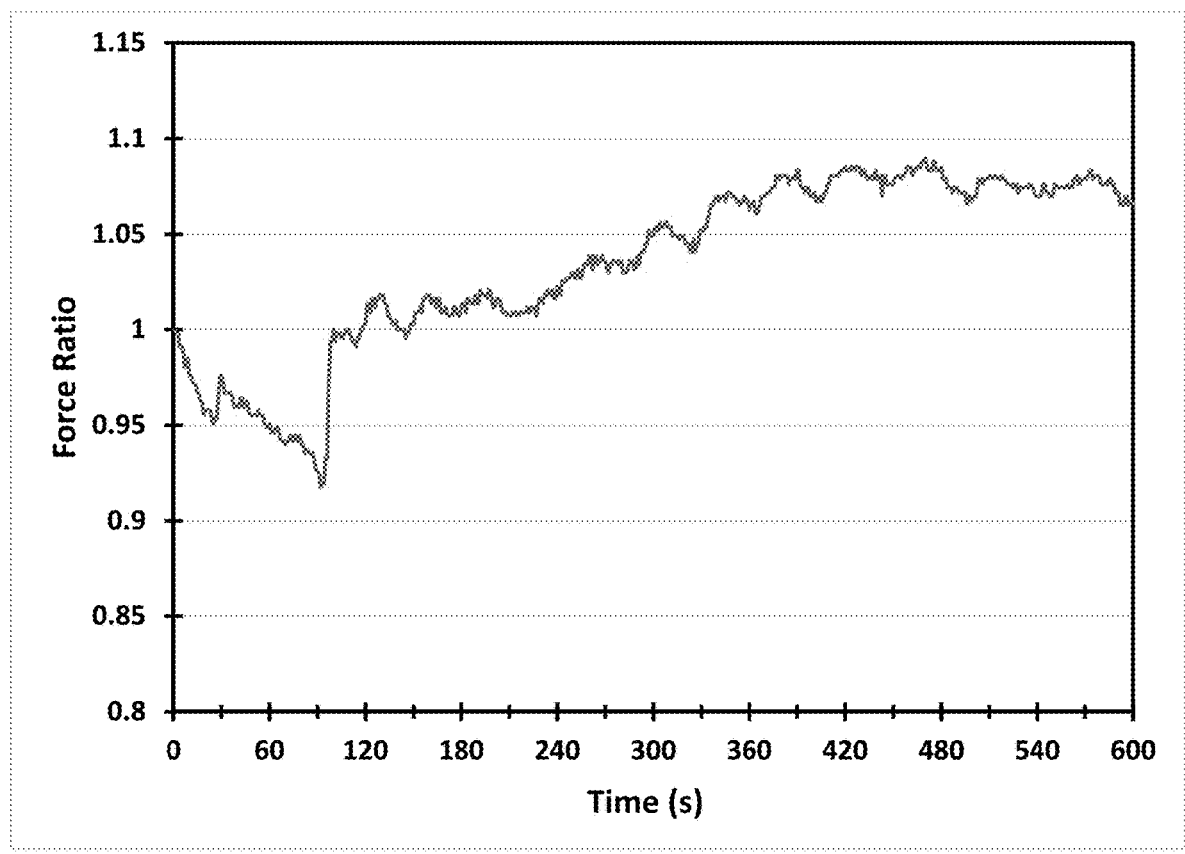
FIG. 4 provides force ratio values as a function of time for Comparative Example D as seen in Table 2.
Figure 5:
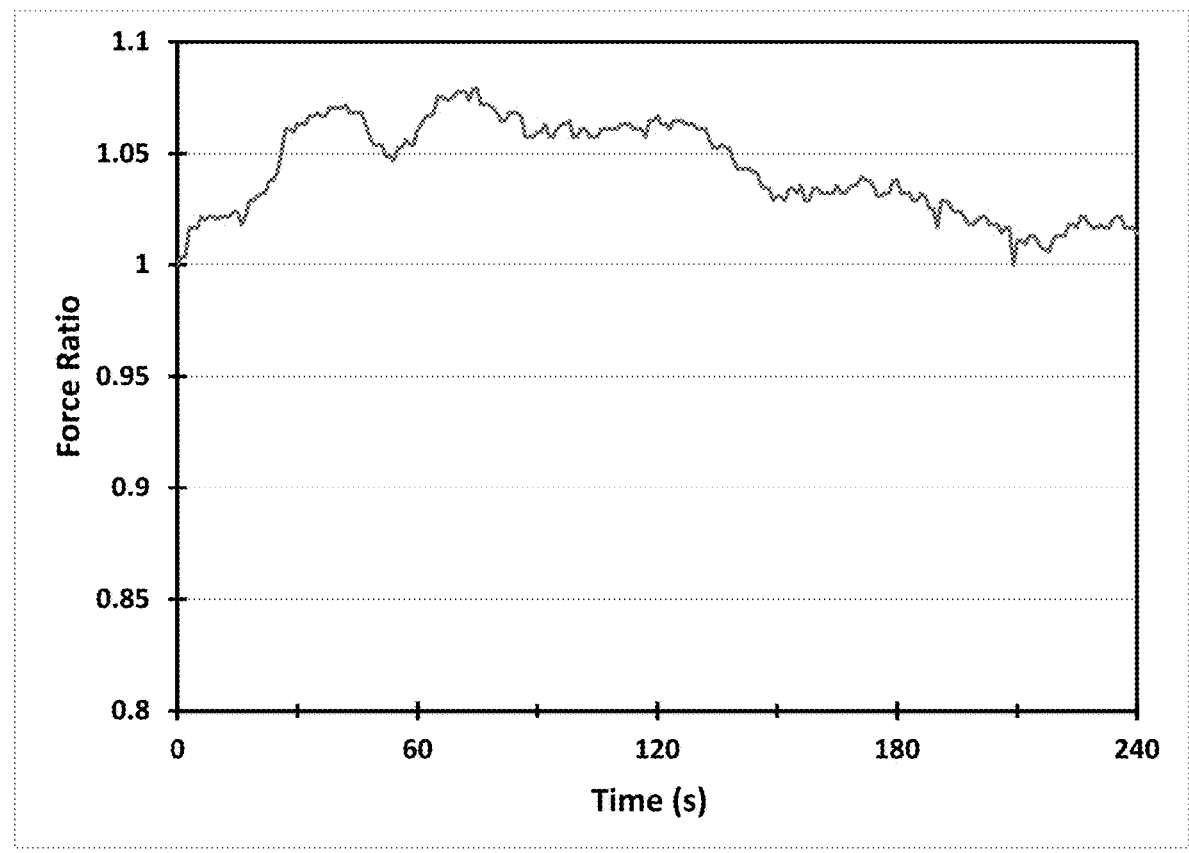
FIG. 5 provides force ratio values as a function of time for Comparative Example E as seen in Table 2.

Unless stated to the contrary, implicit from the context, or customary in the art, all parts and percents herein are based on total weight of the resin, all temperatures are in degree Celsius (° C.), and all test methods are current as of the filing date of this disclosure.

The term "tin oxide-based catalyst", as used herein, refers to the alkyl tin compounds given in this patent application. In addition to acting as a typical catalyst which accelerates chemical reactions they may also participate in the reaction and become bonded to the polymers which participate in the reactions.

The term "composition," as used herein, refers to a mixture of materials that comprise the composition, as well as reaction products and decomposition products formed from the materials of the composition.

"Polymer" means a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), the term copolymer and the term interpolymer as defined hereinafter. Trace amounts of impurities (for example, catalyst residues) may be incorporated into and/or within the polymer. A polymer may be a single polymer, a polymer blend or polymer mixture.

The term "interpolymer," as used herein, refers to polymers prepared by the polymerization of at least two different types of monomers. The generic term interpolymer thus includes copolymers (employed to refer to polymers prepared from two different types of monomers), and polymers prepared from more than two different types of monomers.

The term "polyolefin", as used herein, refers to a polymer that comprises, in polymerized form, a majority amount of olefin monomer, for example ethylene or propylene (based on the weight of the polymer), and optionally may comprise one or more comonomers.

The term "in adhering contact" and like terms mean that one facial surface of one layer and one facial surface of another layer are in touching and binding contact to one another such that one layer cannot be removed from the other layer without damage to the interlayer surfaces (i.e., the in-contact facial surfaces) of both layers.

The terms "comprising," "including," "having," and their derivatives, are not intended to exclude the presence of any additional component, step or procedure, whether or not the same is specifically disclosed. To avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

"Polyethylene" shall mean polymers comprising greater than 50% by weight of units which have been derived from ethylene monomer. This includes polyethylene homopolymers or copolymers (meaning units derived from two or more comonomers). Common forms of polyethylene known in the art include Low Density Polyethylene (LDPE); Linear Low Density Polyethylene (LLDPE); Ultra Low Density Polyethylene (ULDPE); Very Low Density Polyethylene (VLDPE); single-site catalyzed Linear Low Density Polyethylene, including both linear and substantially linear low density resins (m-LLDPE); Medium Density Polyethylene (MDPE); and High Density Polyethylene (HDPE). These polyethylene materials are generally known in the art;

however, the following descriptions may be helpful in understanding the differences between some of these different polyethylene resins.

The term "LDPE" may also be referred to as "high pressure ethylene polymer" or "highly branched polyethylene" and is defined to mean that the polymer is partly or entirely homopolymerized or copolymerized in autoclave or tubular reactors at pressures above 14,500 psi (100 MPa) with the use of free-radical initiators, such as peroxides (see for example U.S. Pat. No. 4,599,392, which is hereby incorporated by reference). LDPE resins typically have a density in the range of 0.916 to 0.935 g/cm$^3$.

The term "LLDPE", includes both resin made using the traditional Ziegler-Natta catalyst systems as well as single-site catalysts, including, but not limited to, bis-metallocene catalysts (sometimes referred to as "m-LLDPE") and constrained geometry catalysts, and includes linear, substantially linear or heterogeneous polyethylene copolymers or homopolymers. LLDPEs contain less long chain branching than LDPEs and includes the substantially linear ethylene polymers which are further defined in U.S. Pat. Nos. 5,272,236, 5,278,272, 5,582,923 and 5,733,155; the homogeneously branched linear ethylene polymer compositions such as those in U.S. Pat. No. 3,645,992; the heterogeneously branched ethylene polymers such as those prepared according to the process disclosed in U.S. Pat. No. 4,076,698; and/or blends thereof (such as those disclosed in U.S. Pat. No. 3,914,342 or 5,854,045). The LLDPEs can be made via gas-phase, solution-phase or slurry polymerization or any combination thereof, using any type of reactor or reactor configuration known in the art.

The term "MDPE" refers to polyethylenes having densities from 0.926 to 0.935 g/cm$^3$. "MDPE" is typically made using chromium or Ziegler-Natta catalysts or using single-site catalysts including, but not limited to, bis-metallocene catalysts and constrained geometry catalysts, and typically have a molecular weight distribution ("MWD") greater than 2.5.

The term "HDPE" refers to polyethylenes having densities greater than about 0.935 g/cm$^3$, which are generally prepared with Ziegler-Natta catalysts, chrome catalysts or single-site catalysts including, but not limited to, bis-metallocene catalysts and constrained geometry catalysts.

The term "ULDPE" refers to polyethylenes having densities of 0.880 to 0.912 g/cm$^3$, which are generally prepared with Ziegler-Natta catalysts, chrome catalysts, or single-site catalysts including, but not limited to, bis-metallocene catalysts and constrained geometry catalysts.

The term "multilayer structure" refers to any structure comprising two or more layers having different compositions and includes, without limitation, multilayer films, multilayer sheets, laminated films, multilayer rigid containers, multilayer pipes, and multilayer coated substrates.

Unless otherwise indicated herein, the following analytical methods are used in the describing aspects of the present invention:

"Density" is determined in accordance with ASTM D792.

"Melt index": Melt indices 12 (or 12) is measured in accordance with ASTM D-1238 at 190° C. and at a 2.16 kg load. The values are reported in g/10 min. "Melt flow rate" is determined according to ASTM D1238 (230° C. at 2.16 kg).

Weight percent of maleic anhydride can be determined according to the method provided in the Examples section herein.

Additional properties and test methods are described further herein.

The present disclosure relates to a resin with excellent adhesion to polyesters, such as polyethylene terephthalate (PET). The resin of the present disclosure comprises a first polyolefin grafted with a functional group selected from an ethylenically unsaturated carboxylic acid, a carboxylic acid anhydride, an ester functional group or a combination thereof, and a tin oxide-based catalyst. The resin of the present disclosure shows improvements in polymer-polymer coupling between a polyolefin and a polyester during coextrusion, film blowing, extrusion lamination, blending or mixing.

The resin of the present disclosure includes up to 99.99 weight percent (wt. %) of a first polyolefin grafted with a functional group selected from an ethylenically unsaturated carboxylic acid, a carboxylic acid anhydride, an ester functional group or a combination thereof, and 0.01 to 3.0 wt. % of a tin oxide-based catalyst, where the resin includes 0.2 wt. % to 1.5 wt. % of the functional group from the first polyolefin, where the wt. % is based on a total weight of the resin. All individual values and subranges for the wt. % of the first polyolefin up to 99.99 wt. % of the resin are included and disclosed herein; for example, the amount of the first polyolefin in the resin can be from a lower limit of 1, 5, 10 and 20 wt. % to an upper limit of 80, 85, 90, 95, 97, 98.5, 99.8 and 99.99 wt. %, where the wt. % is based on a total weight of the resin. Similarly, all individual values and subranges from 0.01 to 3.0 wt. % of the catalyst comprising the tin oxide-based catalyst are included and disclosed herein; for example, the amount of the catalyst comprising the tin oxide-based catalyst can be from a lower limit of 0.01, 0.02, 0.04, 0.08, 0.12 and 0.24 wt. % to an upper limit of 1.8, 2.0, 2.2, 2.4, 2.6, 2.8 and 3.0 wt. %, where the wt. % is based on a total weight of the resin. In addition, all individual values and subranges from 0.2 to 1.5 wt. % of the functional group from the first polyolefin are included and disclosed herein; for example, the amount of the functional group from the first polyolefin can be from a lower limit of 0.2, 0.3, 0.4, 0.5, 0.6 and 0.7 wt. % to an upper limit of 0.9, 1.0, 1.1, 1.2, 1.3, 1.4 and 1.5 wt. %, where the wt. % is based on a total weight of the resin.

In a preferred embodiment, the resin includes 0.4 to 0.8 wt. % of the tin oxide-based catalyst and the resin includes 0.5 to 1.5 wt. % of the functional group from the first polyolefin. In an additional embodiment, the resin of the present disclosure includes 0.4 to 0.8 wt. % of the tin oxide-based catalyst and the resin includes 1.0 to 1.5 wt. % of the functional group from the first polyolefin. In another embodiment, the resin of the present disclosure includes 0.8 wt. % of the tin oxide-based catalyst and the resin includes 1.0 to 1.5 wt. % of the functional group from the first polyolefin. The wt. % values are all based on the total weight of the resin.

It is also possible to associate the amount of the functional group of the first polyolefin with the tin oxide-based catalyst according to a weight percentage ratio of the functional group of the first polyolefin to the tin oxide-based catalyst. For example, the resin of the present disclosure can include the first polyolefin grafted with the functional group selected from the ethylenically unsaturated carboxylic acid, the carboxylic acid anhydride, the ester functional group or a combination thereof and 0.01 to 3.0 wt. % of the tin oxide-based catalyst, where a weight percentage ratio of the functional group of the first polyolefin to the tin oxide-based catalyst is from 0.25:1 to 5:1, and where the resin includes the tin oxide-based catalyst and up to 99.99 wt. % of the first polyolefin, where the wt. % is based on a total weight of the resin. In a preferred embodiment, the weight percentage ratio of the functional group of the first polyolefin to the tin oxide-based catalyst is from 1:1 to 3.75. More preferably, the weight percentage ratio of the functional group of the first polyolefin to the tin oxide-based catalyst is from 1:1 to 2.0. Most preferably, the weight percentage ratio of the functional group of the first polyolefin to the tin oxide-based catalyst is from 1:1 to 1.875.

The first polyolefin grafted with the ethylenically unsaturated carboxylic acid, the carboxylic acid anhydride, the ester functional group or a combination thereof has a density of 0.855 to 0.970 g/cm$^3$. All individual values and subranges from 0.855 to 0.970 g/cm$^3$ are included herein and disclosed herein; for example, the density of the first polyolefin with the ethylenically unsaturated carboxylic acid, the carboxylic acid anhydride, the ester functional group or a combination thereof can be from a lower limit of 0.855, 0.860, 0.870, 0.880, or 0.890 g/cm$^3$ to an upper limit of 0.935, 0.940, 0.945, 0.950, 0.955, 0.960 or 0.970 g/cm$^3$. Preferably, the first polyolefin with the ethylenically unsaturated carboxylic acid, the carboxylic acid anhydride, the ester functional group or a combination thereof has a density of 0.870 to 0.955 g/cm$^3$. Most preferably, the first polyolefin with the ethylenically unsaturated carboxylic acid, the carboxylic acid anhydride, the ester functional group or a combination thereof has a density of 0.890 to 0.930 g/cm$^3$.

In some embodiments, the first polyolefin with the ethylenically unsaturated carboxylic acid, the carboxylic acid anhydride, the ester functional group or a combination thereof has a melt index ($I_2$) of 0.5 g/10 minutes to 1500 g/10 minutes. All individual values and subranges from 0.5 g/10 minutes to 1500 g/10 minutes are included herein and disclosed herein. For example, the first polyolefin with the ethylenically unsaturated carboxylic acid, the carboxylic acid anhydride, the ester functional group or a combination thereof can have a lower limit of the melt index of 0.5, 0.8, 1, or 1.2 g/10 minutes to an upper limit of 16, 40, 50, 100, 200, 1000 or 1500 g/10 minutes. In some embodiments, the first polyolefin with the ethylenically unsaturated carboxylic acid, the carboxylic acid anhydride, the ester functional group or a combination thereof can have a melt index of 0.5 to 200 g/10 minutes, preferably 0.5 to 100 g/10 minutes. Most preferably, the first polyolefin has a melt index ($I_2$) value of 0.5 to 50 g/10 min, where the melt index ($I_2$) is measured in accordance with ASTM D-1238 at 190° C. and at a 2.16 kg load.

As discussed herein, the first polyolefin is grafted with an ethylenically unsaturated carboxylic acid, the carboxylic acid anhydride, the ester functional group or a combination thereof using a reactive extrusion process. Techniques for grafting the ethylenically unsaturated carboxylic acid, the carboxylic acid anhydride, the ester functional group or a combination thereof to the first polyolefin are known in the art (e.g., WO 2017/116843 A1 and Moad, G., "The synthesis of polyolefin graft copolymers by reactive extrusion," Prog. Polym. Sci. 24 (1999), 81). The ethylenically unsaturated carboxylic acid is selected from the group consisting of dibutyl maleate, dicyclohexyl maleate, diisobutyl maleate, dioctadecyl maleate, N-phenylmaleimide, maleic acid, fumaric acid, diethyl fumarate, itaconic acid, citraconic acid, crotonic acid, esters thereof, imides thereof, salts thereof, and Diels-Alder adducts thereof. Ester functional groups can be selected from esters of unsaturated carboxylic acids such as methyl acrylate, ethylene acrylate, butyl acrylate, methyl methacrylate, ethyl methacrylate and butyl methacrylate, among others. The carboxylic acid anhydride is selected from the group consisting of maleic anhydride, citraconic anhydride, tetrahydrophthalic anhydride, bromomaleic anhydride, chloromaleic anhydride, nadic anhydride, methylnadic anhydride, and alkenylsuccinic anhydride, among others. A preferred carboxylic acid anhydride is malic anhydride.

As discussed herein, the first polyolefin is grafted with an ethylenically unsaturated carboxylic acid, ester functional groups or combination thereof using a reactive extrusion process. It is also possible that the ethylenically unsaturated carboxylic acid, ester functional groups or combination thereof can be incorporated into the first polyolefin not by grafting, but rather by other chemical techniques as are known. For example, the ethylenically unsaturated carboxylic acid, ester functional groups or combination thereof can be incorporated into the first polyolefin during the polymerization of the first polyolefin. Examples include, but are not limited to, copolymerizing ethylene with maleic anhydride to form the first polyolefin useful for the resin of the present disclosure.

For the various embodiments, the first polyolefin is selected from the group consisting of a polyethylene, a polypropylene, an ethylene/alpha-olefin copolymer, a propylene/alpha-olefin copolymer and combinations thereof. In one preferred embodiment, the first polyolefin is a random ethylene/alpha-olefin copolymer grafted with maleic anhydride, where the random ethylene/alpha-olefin copolymer grafted with maleic anhydride has a grafted maleic anhydride level of 0.05 to 3.0 wt. % maleic anhydride based on the total weight of the random ethylene/alpha-olefin copolymer grafted with maleic anhydride. In another preferred embodiment, the first polyolefin is a polyethylene grafted with maleic anhydride, where the polyethylene grafted with maleic anhydride has a grafted maleic anhydride level of 0.05 to 3.0 wt. % maleic anhydride based on the total weight of the polyethylene grafted with maleic anhydride. It is also possible that for the various embodiments the first polyolefin is an ethylene interpolymer having copolymerized anhydrides (e.g., maleic anhydride).

The polyethylene grafted with maleic anhydride is selected from a group consisting of a high-density polyethylene, a medium density polyethylene, linear low-density polyethylene, a low-density polyethylene, an ethylene/alpha-olefin copolymer having a density of 0.855 g/cm$^3$ to 0.970 g/cm$^3$ and combinations thereof. In an additional embodiment, the first polyolefin is a block ethylene/alpha-olefin copolymer grafted with maleic anhydride, where the polyethylene grafted with maleic anhydride has a grafted maleic anhydride level of 0.05 to 3.0 wt. % maleic anhydride based on the total weight of the ethylene/alpha-olefin copolymer grafted with maleic anhydride. All individual values and subranges from 0.05 to 3.0 wt. % maleic anhydride on the total weight of the maleic anhydride grafted polyethylene are included herein and disclosed herein; for example, the wt. % of maleic anhydride can be from a lower limit of 0.01, 0.05, 0.09, 0.12, 0.15, 0.18, 0.20 or 0.25 wt. % to an upper limit of 1.8, 1.9, 2.0, 2.1, 2.2, 2.8 or 3.0 wt. %. Preferably, the total weight of the maleic anhydride grafted polyethylene is from 0.01 to 2.4 wt. %.

Examples of commercially available polyethylenes and/or maleic anhydride grafted polyethylenes for use in the present disclosure include, but are not limited to, ELITE™, DOWLEX™, ENGAGE™ and AMPLIFY™, each of which are commercially available from The Dow Chemical Company. Other examples include, but are not limited to, BONDYRAM® supplied by Polyram Ram-On Industries, ADMER™ supplied by Mitsui Chemicals Europe GmbH, PLEXAR® supplied by LyondellBasell, and POLYBOND® supplied by Addivant. Examples of interpolymers useful for the present disclosure include those sold under the trade designator BYNEL® and/or FUSABOND®, both of which are supplied by DuPont™.

For any of the embodiments herein, the grafted maleic anhydride level can be 0.20 to 1.0 wt. % maleic anhydride.

In some embodiments, the resin of the present disclosure may further (optionally) include a second polyolefin having a density of 0.855 to 0.970 g/cm$^3$, where the second polyolefin is different than the first polyolefin. For the various embodiments, the second polyolefin is selected from a group consisting of a high-density polyethylene, a medium density polyethylene, linear low-density polyethylene, a low-density polyethylene, an ethylene/alpha-olefin copolymer having a density of 0.855 g/cm$^3$ to 0.970 g/cm$^3$ and combinations thereof. All individual values and subranges from 0.855 to 0.970 g/cm$^3$ are included herein and disclosed herein; for example, the density of the second polyolefin can be from a lower limit of 0.855, 0.860, 0.865, 0.870, 0.875 or 0.880 g/cm$^3$ to an upper limit of 0.910, 0.920, 0.930, 0.940, 0.945, 0.950, 0.955, 0.960 or 0.970 g/cm$^3$. Preferably, the second polyolefin has a density of 0.870 to 0.920 g/cm$^3$. Most preferably, the second polyolefin has a density of 0.890 to 0.920 g/cm$^3$.

In some embodiments, the second polyolefin has a melt index (I$_2$) of 0.1 g/10 minutes to 1000 g/10 minutes. All individual values and subranges from 0.1 g/10 minutes to 1000 g/10 minutes are included herein and disclosed herein. For example, the second polyolefin can have a lower limit of the melt index of 0.1, 0.25, 0.50, 0.75, 1 or 1.25 g/10 minutes to an upper limit of 30, 100, 300, 500, or 1000 g/10 minutes.

For the various embodiments, the second polyolefin is selected from a group consisting of a linear low-density polyethylene, a low-density polyethylene, a third polyolefin or a combination thereof, where the third polyolefin is different than the first polyolefin. Examples of commercially available second polyolefins include DOWLEX', ELITE'" and AFFINITY", available from The Dow Chemical Company.

For the various embodiments, the resin can include (when present) greater than 0 to 80 wt. % of the second polyolefin based on the total weight of the resin, where the total weight of the first polyolefin, the catalyst and the second polyolefin totals 100 wt. %. All individual values and subranges from greater than 0 to 80 wt. % of the second polyolefin are included herein and disclosed herein; for example, the resin can include a lower limit of greater than 0, a value of 5, 10, 15 or 20 wt. % to an upper limit of 40, 50, 60, 70 or 80 wt. % of the second polyolefin based on the total weight of the resin. For example, the resin can include the second polyolefin having a density of 0.855 to 0.970 g/cm$^3$, where the resin includes 10 to 80 wt. % of the second polyolefin based on the total weight of the resin and the total weight of the first polyolefin, the catalyst and the second polyolefin totals 100 wt. %. In an additional embodiment, the resin includes the second polyolefin having a density of 0.855 to 0.970 g/cm$^3$, where the resin includes 20 to 60 wt. % of the second polyolefin based on the total weight of the resin and the total weight of the first polyolefin, the catalyst and the second polyolefin totals 100 wt. %.

The resin of the present disclosure can also further include 5 to 95 wt. % of a polyester based on the total weight of the resin. All individual values and subranges from 5 to 95 wt. % of the polyester are included herein and disclosed herein; for example, the resin can include a lower limit of 5, 10, 15 20 or 25 wt. % of the polyester to an upper limit of 75, 80, 85, 90 or 95 wt. % of the polyester based on the total weight of the resin. For the various embodiments, the polyester can be selected from the group consisting of polyethylene terephthalate (PET), polybutylene terephthalate (PBT), PET-glycol (PET-g), a PET copolymer, polylactic acid and combinations thereof. Other copolymers of PET, such as those formed with isophthalic acid and/or cyclohexane dimethanol are also possible polyesters for the present disclosure. Additional polyesters for the present disclosure include a polylactic acid, such as those available under the trade designator NATUREWORKS from Cargill Dow LLC and LACEA™ from Mitsui Chemical. An example of a suitable commercially available diacid/diol aliphatic polyester is the polybutylene succinate/adipate copolymers sold as BIONOLLE 1000 and BIONOLLE 3000 from the Showa High Polymer Company, Ltd. (Tokyo, Japan). An example of a suitable commercially available aliphatic/aromatic copolyester is the poly(tetramethylene adipate-co-terephthalate) sold as EASTAR BIO Copolyester from Eastman Chemical or ECOFLEX from BASF.

For the various embodiments, the polyester has a viscosity within one order of magnitude of a viscosity of the first polyolefin, where the viscosity is measured according to ASTM D4440.

The resin of the present disclosure can be formed by admixing the first polyolefin grafted with the functional group selected from an ethylenically unsaturated carboxylic acid, the carboxylic acid anhydride, the ester functional group or a combination thereof with the tin oxide-based catalyst, and optionally either the second polyolefin or the polyester (both as discussed herein) in a melt state via an extrusion process or batch mixer, as are known in the art. The duration of admixing is such that a homogenous mixture of the first polyolefin grafted with the functional group selected from an ethylenically unsaturated carboxylic acid, the carboxylic acid anhydride, the ester functional group or a combination thereof with the tin oxide-based catalyst, and, optionally, either the second polyolefin or the polyester (both as discussed herein) is produced, where the admixture is the resin of the present disclosure. Heat can be added to the mixing process, as needed, to allow the first polyolefin grafted with the functional group selected from an ethylenically unsaturated carboxylic acid, the carboxylic acid anhydride, the ester functional group or a combination thereof to mix with the tin oxide-based catalyst, and, optionally, either the second polyolefin or the polyester in a melt state. Mixing can take place at atmospheric pressure.

As discussed herein, the resin of the present disclosure includes a tin oxide-based catalyst. For the catalyst, the tin oxide-based catalyst is selected from the group consisting of dibutyltin oxide, dioctyltin oxide and combinations thereof. Preferably, the tin oxide-based catalyst is dioctyltin oxide. The resin can include 0.01 to 3.0 wt. % of the tin oxide-based catalyst, where the wt. % values are based on the total weight of the resin. The amount of catalyst used in the resin of the present disclosure can depend on several factors including the amount of the first polyolefin grafted with the ethylenically unsaturated carboxylic acid, the carboxylic acid anhydride, the ester functional group or a combination thereof and the second polyolefin or the polyester (when present), the catalyst used, the composition of the PET layer and other layers adjacent to the resin, among other factors.

The alkyl tin-catalyst can be added neat to the first polyolefin in forming the resin, or the tin oxide-based catalyst can be added in a "masterbatch" to the first polyolefin in making the resin having the compositions recited herein. The tin oxide-based catalyst can be added at a number of different times to provide the resin according to embodiments of the present invention. In some embodiments, the tin oxide-based catalyst can be added when a polyolefin is grafted with the ethylenically unsaturated carboxylic acid, the carboxylic acid anhydride, the ester functional group or a combination thereof to provide the resin of the present disclosure. As additional examples, the catalyst can be added when a pellet of the first polyolefin is formed and any other components of the resin, or the catalyst can be blended in-line at an extruder with the other components of the resin.

Multilayer Structures

Embodiments of the present disclosure also relate to multilayer structures that include a layer formed from a resin of the present invention. The resin of the present disclosure can provide several advantages when used in multilayer structures. For example, in addition to providing adhesion between a PET layer and adjacent polyolefin layers, the resin of some embodiments of the present disclosure can further act as a moisture and/or gas barrier, particularly when positioned adjacent to a conventional barrier layer, such as a barrier layer comprising ethylene vinyl alcohol and/or polyamide. This can advantageously protect against deterioration of gas barrier properties when a multilayer structure is exposed to high moisture or relative humidity in some embodiments. Likewise, the use of the resin of the present disclosure, in some embodiments, can eliminate the need for other approaches to protect against gas barrier deterioration (e.g., increasing the thickness of LDPE or LLDPE layers in the structure, adding HDPE layer(s) to the structure, including an extra amount of EVOH or polyamide in the barrier layer or structure, etc.).

In one aspect, a multilayer structure comprises at least two layers arranged in order Layer A/Layer B, where each of the at least two layers has a first major surface and a second major surface opposite the first major surface. Layer A comprises the resin of the present disclosure and Layer B comprises a polyester, where a first major surface of Layer A is in adhering contact with the second major surface of Layer B. For the multilayer structure, the polyester of Layer B is selected from the group consisting of a film of polyethylene terephthalate (PET), polybutylene terephthalate (PBT), PET-glycol (PET-g), a PET copolymer, polylactic acid and combinations thereof, where embodiments of such polymers are provided herein.

The multilayer structure of the present disclosure can also include at least a third layer, a Layer C, which has a first major surface and a second major surface opposite the first major surface. So, the multilayer structure can include at least three layers arranged in order Layer C/Layer A/Layer B, where each of the at least three layers has a first major surface and a second major surface opposite the first major surface and where a first major surface of Layer A is in adhering contact with the second major surface of Layer B and the second major surface of Layer A is in adhering contact with the second major surface of Layer C. Layer A comprises the resin of the present disclosure, Layer B comprises a polyester, and Layer C comprises a polyolefin film selected from the group consisting of a film of polyethylene, polypropylene or mixtures thereof. Preferably, the polyolefin film is a film of polyethylene.

It should be understood that in some embodiments the multilayer structure of the present disclosure can include additional layers (e.g., Layer D, Layer E, etc.) such as additional polyester layers, which can be formed from the same or different polyester as Layer B, while in other embodiments, such additional layers can be formed from different polyolefin films. In other embodiments, the multilayer structure may comprise one or more additional layers adjacent to the resin of the present disclosure (e.g., Layer A). It should be understood that for the examples above, the first and last layers identified for each example may be the outermost layer in some embodiments, while in other embodiments, one or more additional layers may be adjacent to such layers.

When a multilayer structure comprising the combinations of layers disclosed herein is a multilayer film, the film can have a variety of thicknesses depending, for example, on the number of layers, the intended use of the film, and other factors. In some embodiments, multilayer films of the present disclosure have a thickness of 15 microns to 5 millimeters. Multilayer films of the present invention, in some embodiments, have a thickness of 20 to 500 microns (preferably 50-200 microns). When the multilayer structure is something other than a film (e.g., a rigid container, a pipe, etc.), such structures can have a thickness within the ranges typically used for such types of structures.

Multilayer structures of the present disclosure can exhibit one or more desirable properties. For example, in some embodiments, multilayer structures can exhibit desirable barrier properties, temperature resistance, optical properties, stiffness, sealing, toughness, puncture resistance, and others.

The present disclosure also provides for a package formed with the multilayer structure of the multilayer structure as provided herein. Multilayer structures of the present disclosure can include a combination of two or more embodiments as described herein. Embodiments of the present disclosure also relate to articles comprising any of the multilayer structures (e.g., multilayer films) disclosed herein.

Some embodiments of multilayer structures can include layers beyond those described above. For example, while not necessarily in adhering contact with a resin according to the present invention, a multilayer structure can further comprise other layers typically included in multilayer structures depending on the application including, for example, other barrier layers, sealant layers, tie layers, other polyethylene layers, polypropylene layers, etc. Additionally, other layers such as printed, high modulus, high gloss layers may be laminated to multilayer structures (e.g., films) of the present disclosure. Further, in some embodiments, the multilayer structure can be extrusion coated to a fiber containing substrate such as paper.

It should be understood that any of the foregoing layers can further comprise one or more additives as known to those of skill in the art such as, for example, antioxidants, ultraviolet light stabilizers, thermal stabilizers, slip agents, antiblock, pigments or colorants, processing aids, crosslinking catalysts, flame retardants, fillers and foaming agents.

Methods of Preparing Multilayer Structures

When the multilayer structure is a multilayer film or formed from a multilayer film, such multilayer films can be coextruded as blown films or cast films using techniques known to those of skill in the art based on the teachings herein. In an addition embodiment, the layers can be coextruded via a cast film process or multi-layer extrusion coating process. In particular, based on the compositions of the different film layers disclosed herein, blown film manufacturing lines and cast film manufacturing lines can be configured to coextrude multilayer films of the present disclosure in a single extrusion step using techniques known to those of skill in the art based on the teachings herein.

Packages

Multilayer films of the present disclosure can be formed into a variety of packages using techniques known to those of skill in the art. In general, multilayer structures of the present disclosure can be converted into any form of package and deployed under a variety of environmental conditions. Multilayer structures of the present disclosure, in some embodiments, can be particularly useful in converted packages that are subject to, or must undergo, high moisture conditions and/or stretched, during their service life. Examples of packages that can be formed from multilayer structures of the present disclosure includes, without limitation, stand-up pouches, bags, extrusion coated paper boards, and others.

Similarly, multilayer structure as provided herein can be used to form a laminate. In other words, a laminate is formed with the multilayer structure of the present disclosure. A structural panel formed using the multilayer structure of the present disclosure is also possible.

Other multilayer structures that can be formed include, for example, multilayer sheets, laminated films, multilayer rigid containers, multilayer pipes, and multilayer coated substrates. Such articles can be formed using techniques known to those of skill in the art based on the teachings herein.

Some embodiments of the disclosure will now be described in detail in the following Examples.

EXAMPLES

Use the following test methods for the Examples.

Melt Index

Measure melt index (MI), $I_2$, in accordance to ASTM D-1238 at 190° C. and at 2.16 kg, where values in g/10 min that correspond to grams eluted per 10 minutes.

Density

Measurements made according to ASTM D 1505.

Compounding Catalyst with PE-Component

Mix components (e.g., tin oxide-based catalyst, HDPE, MAH grafted PE, but not PET-g) of each given sample in amount shown in Table 2 and place each sample in a glass bottle and dry under vacuum at 60° C. overnight. Add sample to twin-screw extruder (16 mm, PRISM, L:D 24:1, ThermoFisher Scientific) having a feed zone temperature of 135° C., a midpoint temperature of 160° C. and an exit temperature of 160° C., rotating at 25 rpm. In-line, cool the extruded strand using a water bath, then dry using an air knife and pelletize the extrudate of each sample and dry under vacuum at 60° C. overnight. Re-compound the pelletize extrudate of each sample in the twin-screw extruder having the setting noted above. Dry the re-compound extrudate of each sample under vacuum at 60° C. overnight prior to any further compounding or specimen preparation. The resultant material is used for lamination and capillary coextrusion processes, which produced samples for adhesion testing.

Micro-Compounder Force Measurement

Add a 4-gram sample of a master batch mixture of MAH grafted polyethylene and PETG or PET (70 wt. %/30 wt. %, as seen in Table 2) for each Example and Comparative Example resin shown in Table 2 to a Model MC5 Xplore Microcompounder. Mix each 4-gram sample in the Xplore Microcompounder at 100 rpm screw speed and a constant set temperature across all heating zones (220° C. for all PETG blends and 270° C. for all PET blends) for about one minute to acquire a base-line force reading for the given sample. Add the catalyst for each given resin sample in the amount shown in Table 2 and continue to mix the resin sample using the Xplore Microcompounder under the same conditions provided above. Record the force change after catalyst addition as function of time (seconds). Calculate a "Force Ratio" by dividing the force values recorded for a given resin sample by the base-line force value of the given sample.

Determining Weight Percent of Maleic Anhydride (MAH) in MAH Grafted Polyethylene Determine percent maleic anhydride (MAH) grafting using the ratio of peak heights of the MAH ($FTIR_{MAH}$) and the peak heights of the maleic acid ($FTIR_{MA}$) to the peak heights of the polymer reference ($FTIR_{ref}$). Measure the peak heights of MAH at wave number 1791 $cm^{-1}$, the peak heights of maleic acid (MA) at 1721 $cm^{-1}$ and the peak heights of polyethylene, the reference polymer, at 2019 $cm^{-1}$. Multiply the ratio of peak heights by the appropriate calibration constants (A and B) and add the products of the ratios and calibration constants together to equal the MAH wt. %. When polyethylene is the reference polymer, the MAH wt. % is calculated according to the following MAH wt. % formula:

$$MAH = wt\% = A\left(\frac{FTIR_{MAH} @ 1791\ cm^{-1}}{FTIR_{ref} @ 2019\ cm^{-1}}\right) + B\left(\frac{FTIR_{MA} @ 1721\ cm^{-1}}{FTIR_{ref} @ 2019\ cm^{-1}}\right)$$

Determine the calibration constant A using $C^{13}$ NMR standards, which are known in the field. The actual calibration constant may differ slightly depending on the instrument and the polymers. The peak heights of maleic acid account for the presence of maleic acid in the polyolefins, which is negligible for freshly grafted polyolefins. However, over time, and in the presence of moisture, maleic anhydride is converted to maleic acid. For MAH grafted polyolefins having a high surface area, significant hydrolysis can occur under ambient conditions in just a few days. The calibration constant B is a correction for the difference in extinction coefficients between the anhydride and acid groups, which can be determined by standards known in the field. The MAH wt. % formula takes different sample thicknesses into account to normalize the data.

Prepare a sample of the MAH grafted polyolefin for FTIR analyst in a heating press. Place a 0.05 mm to about 0.15 mm in thickness sample of the MAH grafted polyolefin between suitable protective films, such as MYLAR™ or TEFLON™, to protect it from the platens of the heating press. Place the sample in the heating press at a temperature of about 150-180° C. press under about 10 tons of pressure for about five minutes. Allow the sample to remain in the heating press for about one hour and then allow to cool to room temperature (23° C.) before scanning in the FTIR.

Run a background scan on the FTIR before scanning each sample, or as needed. Place the sample in an appropriate FTIR sample holder and scan in the FTIR. The FTIR will typically display an electronic graph providing the peak heights of MAH at wave number 1791 $cm^{-1}$, the peak heights of maleic acid at 1721 $cm^{-1}$, and the peak heights of polyethylene at 2019 $cm^{-1}$. The FTIR test should have an inherent variability less than +/−5%.

Materials:

TABLE 1

| Product (Source) | Type | Density (g/cm³) | Melt Index, 2.16 kg, 190° C., dg/min | Maleic Anhydride Concentration (wt. % based on total product wt.) |
| --- | --- | --- | --- | --- |
| DOW ™ AMPLIFY ™ GR205 (The Dow Chemical Company, TDCC) | Maleic Anhydride (MAH) grafted polyethylene | 0.96 | 2 | >1 wt. % |
| POLYBOND ® 3029 (Addivant ™) | MAH grafted polyethylene | 0.95 | 4.0 | 1.5 wt. % |

TABLE 1-continued

| Product (Source) | Type | Density (g/cm³) | Melt Index, 2.16 kg, 190° C., dg/min | Maleic Anhydride Concentration (wt. % based on total product wt.) |
|---|---|---|---|---|
| DPDA-3220 NT 7 (TDCC) | High Density Polyethylene (HDPE) | 0.94 | 2 | 0 |
| Eastman Spectar ™ Copolyester 14471 (Eastman Chemical Company) | Polyethylene Terephthalate Glycol-Modified (Amorphous) | 1.27 | | 0 |
| Laser+ ® CE60A (DAK Americas) | Polyethylene Terephthalate | | | 0 |
| Di-Butyltin Oxide (DBTO) (Sigma Aldrich, >98.0 wt % purity, product number 183083) | Tin Oxide-Based Catalyst | | | |
| Di-n-Octyltin Oxide (DOTO) (TCI America, >98.0 wt % purity, product number D1373) | Tin Oxide-Based Catalyst | | | |
| Titinium Butoxide (Sigma Aldrich, >97 wt % purity, product number 244112) | Catalyst | | | |
| Tin Chloride Dihydrate (Sigma Aldrich, >98% purity, product number 208035) | Tin Based Catalyst | | | |
| Tin (II) 2-etylhexanoate (tin octoate) (Sigma Aldrich, >92.5% purity, product number: S3252) | Tin Based Catalyst | | | |
| Butyltinchloride-dihydroxide Sigma Aldrich, >96 wt % purity, product number 344923 | Tin Based Catalyst | | | |
| Zinc Acetate Dihydrate Alfa Aesar, >98% purity, product number 11559 | Catalyst | | | |

TABLE 2

| Resin | Catalyst | MAH grafted polyethylene | PETG | Process Temperature | FIG. |
|---|---|---|---|---|---|
| Comparative Example A | Titanium Butoxide (1.5 wt. %²) | DOW ™ AMPLIFY ™ GR205 (70 wt. %¹) | PETG (30 wt. %¹) | 220° C. | 1 |
| Comparative Example B | Tin Chloride (1.5 wt. %²) | DOW ™ AMPLIFY ™ GR205 (70 wt. %¹) | PETG (30 wt. %¹) | 220° C. | 2 |
| Comparative Example C | Tin Octoate (1.5 wt. %²) | DOW ™ AMPLIFY ™ GR205 (70 wt. %¹) | PETG (30 wt. %¹) | 220° C. | 3 |
| Comparative Example D | Butyltinchloride-dihydroxide (1.5 wt. %²) | DOW ™ AMPLIFY ™ GR205 (70 wt. %¹) | PETG (30 wt. %¹) | 220° C. | 4 |
| Comparative Example E | Zinc Acetate (1.5 wt. %²) | DOW ™ AMPLIFY ™ GR205 (70 wt. %¹) | PETG (30 wt. %¹) | 220° C. | 5 |
| Comparative Example F | Tin Chloride (1.5 wt. %²) | DOW ™ AMPLIFY ™ GR205 (70 wt. %¹) | PET (30 wt. %¹) | 270° C. | 6 |
| Comparative Example G | Butyltinchloride-dihydroxide (1.5 wt. %²) | DOW ™ AMPLIFY ™ GR205 (70 wt. %¹) | PET (30 wt. %¹) | 270° C. | 7 |
| Example 1 | DOTO (1.5 wt. %²) | DOW ™ AMPLIFY ™ GR205 (70 wt. %¹) | PETG (30 wt. %¹) | 220° C. | 8 |
| Example 2 | DBTO (1.5 wt. %²) | DOW ™ AMPLIFY ™ GR205 (70 wt. %¹) | PETG (30 wt. %¹) | 220° C. | 9 |

TABLE 2-continued

| Resin | Catalyst | MAH grafted polyethylene | PETG | Process Temperature | FIG. |
|---|---|---|---|---|---|
| Example 3 | DBTO (1.5 wt. %[2]) | DOW ™ AMPLIFY ™ GR205 (70 wt. %[1]) | PET (30 wt. %[1]) | 270° C. | 10 |
| Example 4 | DOTO (1.5 wt. %[2]) | DOW ™ AMPLIFY ™ GR205 (70 wt. %[1]) | PET (30 wt. %[1]) | 270° C. | 10 |

[1]wt. % based on total weight of MAH grafted polyethylene and PET/PETG.
[2]wt. % based on total weight of Example or Comparative Example.

Figure 6:
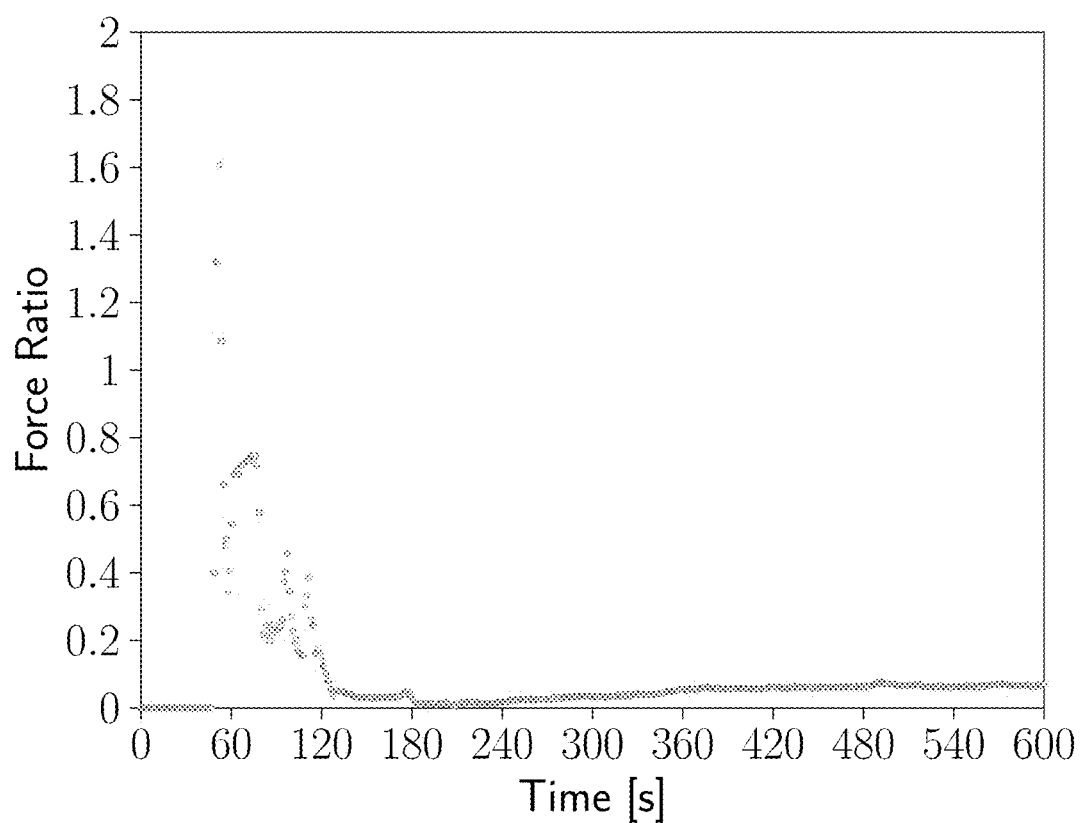
FIG. 6 provides force ratio values as a function of time for Comparative Example F as seen in Table 2.
Figure 7:
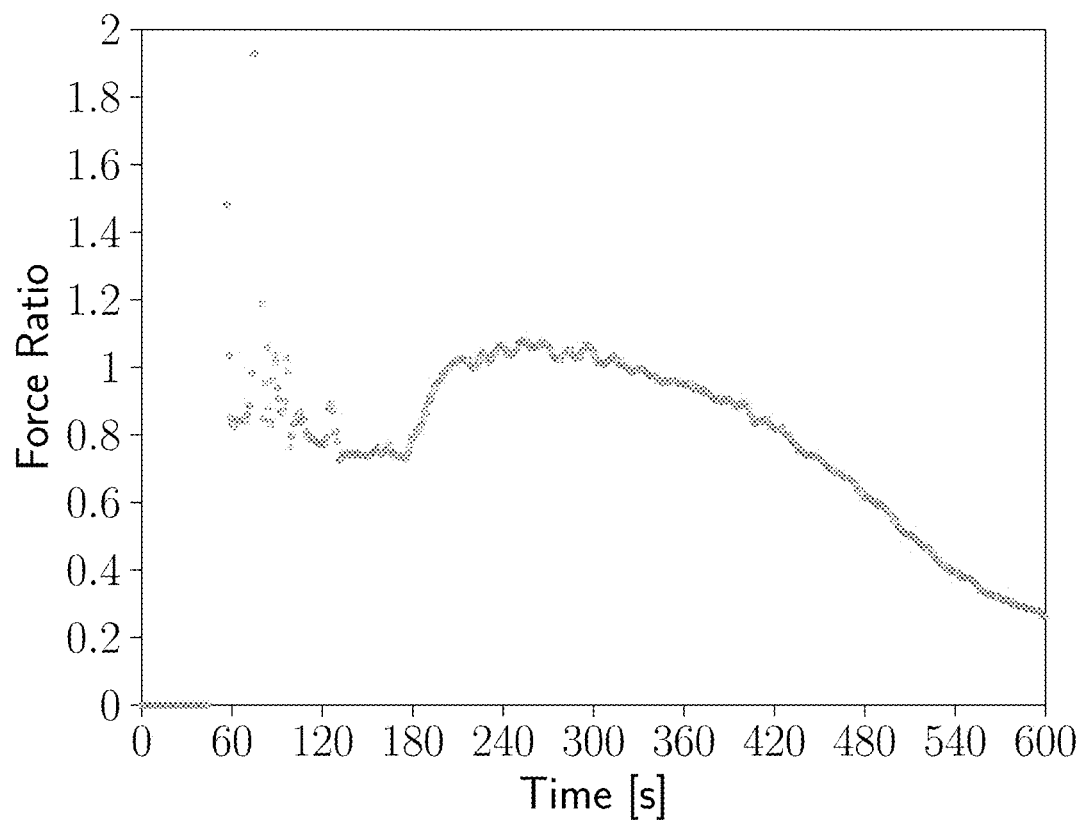
FIG. 7 provides force ratio values as a function of time for Comparative Example G as seen in Table 2.

FIGS. 1-10 show the force measured by the Microcompounder in mixing the Comparative Examples and Examples resins provided in Table 2. Each of FIGS. 1-10 provide the Microcompounder mixer force reading for a 70 wt. %/30 wt. % blend of MAH grafted polyethylene and PETG or PET as a function of time after the catalyst (Table 2) was added to the mixture to form the resin. For Comparative Examples A through Comparative Example E, FIGS. 1 through 5 (corresponding to Comparative Examples A through Comparative Example E respectively) show a 5 to 10 percent change (e.g., increase) in the force ratio values from the initial force ratio value of 1 (the normalized base-line force reading for the sample). FIGS. 6 and 7 for two catalysts compounded at 270° C. with PET show a decrease in force ratio.

Figure 8:
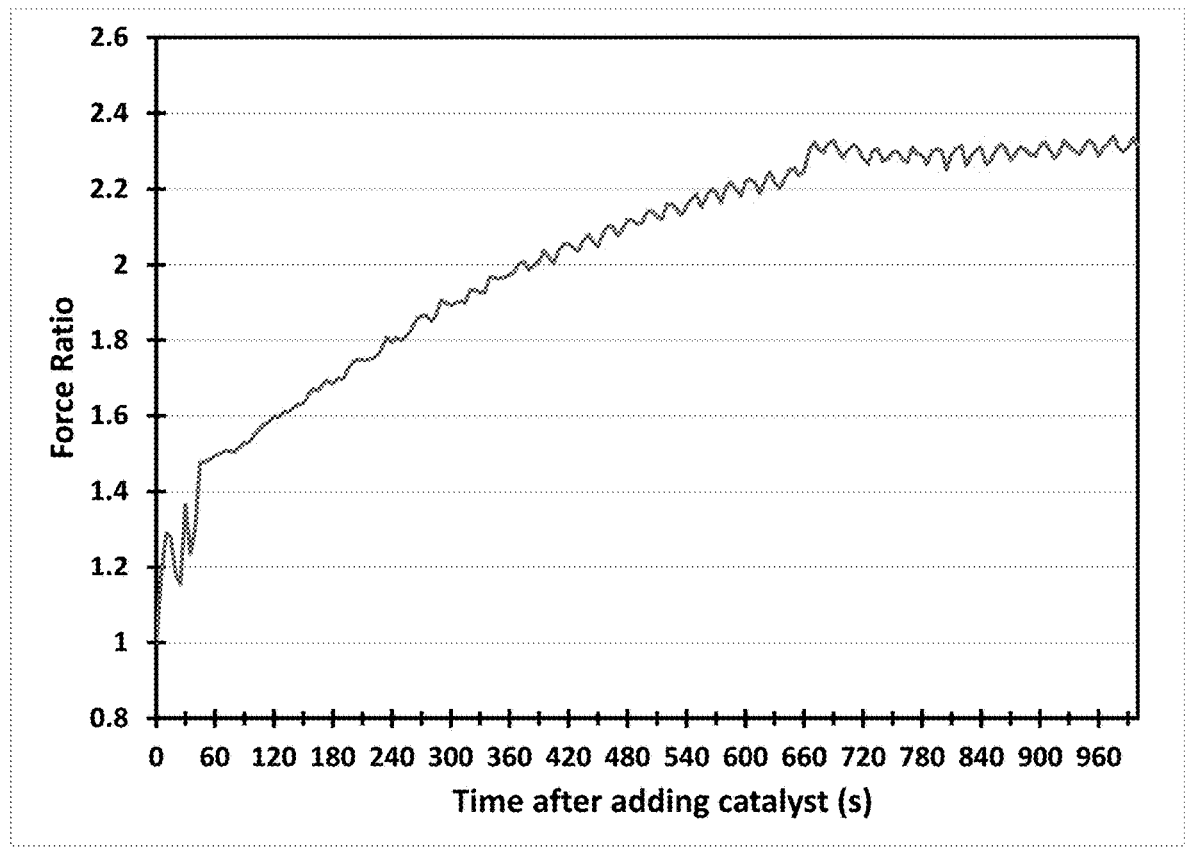
FIG. 8 provides force ratio values as a function of time for Example 1 as seen in Table 2.
Figure 9:
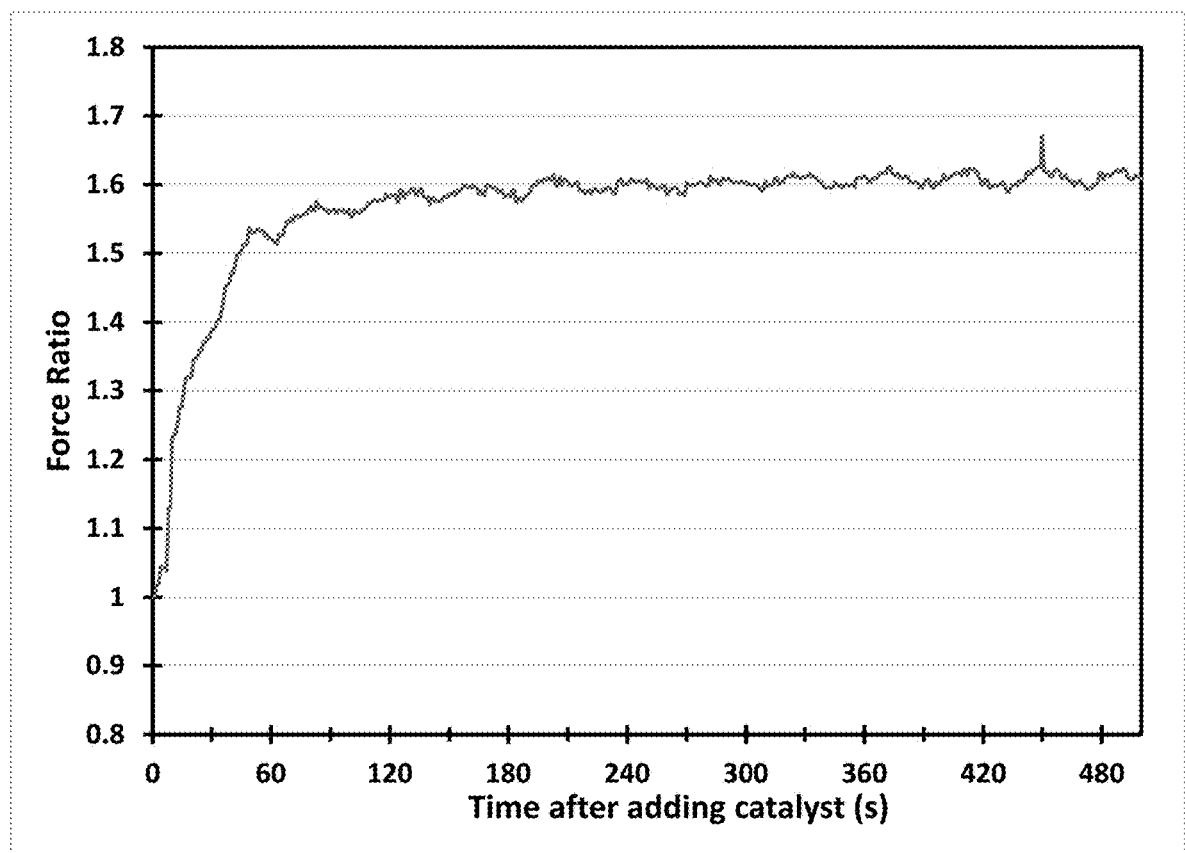
FIG. 9 provides force ratio values as a function of time for Example 2 as seen in Table 2.
Figure 10:
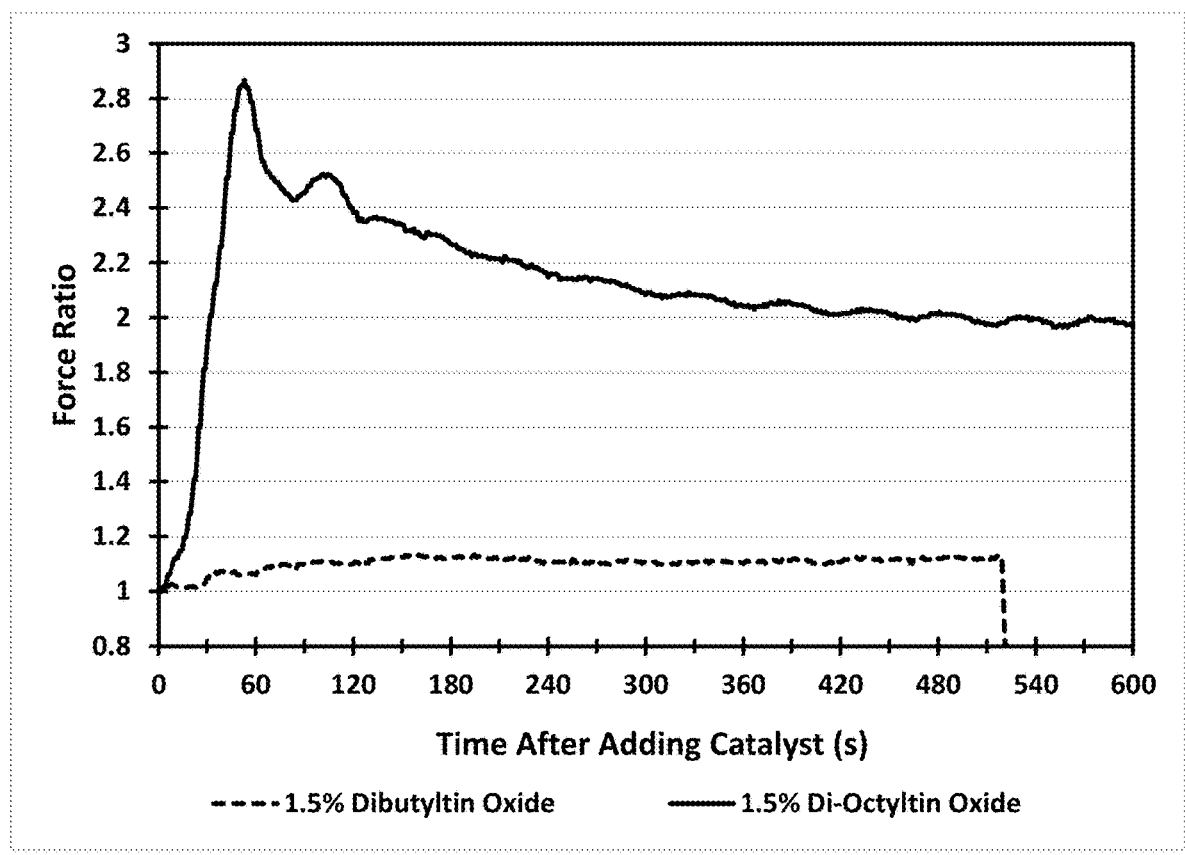
FIG. 10 provides force ratio values as a function of time for Example 3 and 4 as seen in Table 2.

In contrast, FIG. 8 (corresponding to the resin of Example 1) shows a 60 percent increase in the force ratio values from the initial force ratio value of 1 (the normalized base-line force reading for the sample) after about 2.5 minutes after adding the tin oxide-based catalyst. As seen in FIG. 9, the resin of Example 2 shows about a 130 percent increase in the force ratio values from the initial force ratio value of 1 after about 12 minutes after adding the tin oxide-based catalyst. FIG. 10 shows the force ratio values of the resin of Examples 3 and 4 (process temperature of 270° C.), where the use of DOTO (Example 4) helps to increase the force ratio values by about 180 percent from the initial force ratio value of 1 after only about 1 minute, whereas there is only a comparatively slight increase in the force ratio values for the resin of Example 3.

Peel Test

Figure 12:
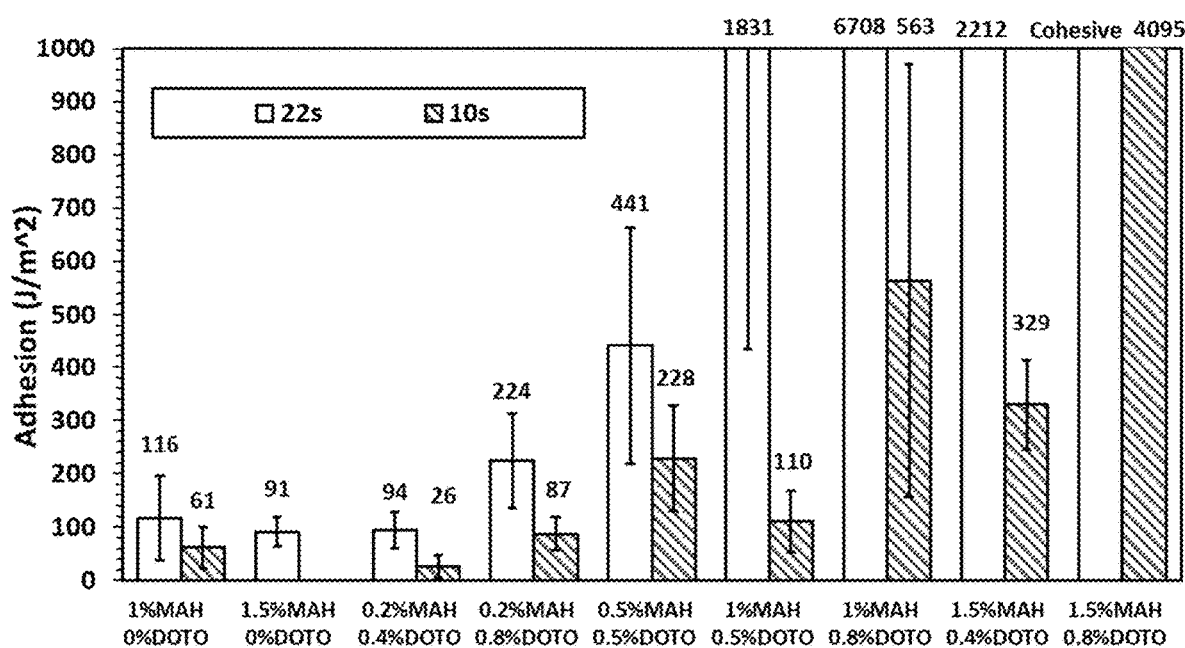
FIG. 12 provides data of the adhesive force between bi-layer structures for both Comparative Examples and Examples of the present disclosure.

Conduct a bi-layer peel test as follows. For each sample, melt the PETG at 230° C. or PET at 270° C. and, using a Carver hot, press the melt between a 3.175 mm steel plate and a 1 mm thick steel mold with 907 kg of pressure to produce a 1 mm thick film. Use a sheet of polytetrafluoroethylene (PTFE) to prevent the film from sticking to the steel plate. Similarly, for each sample, process the MAH grafted polyethylene (with and without catalyst as seen in FIG. 12) using the same process in forming the film of PET or PETG, except melt the MAH grafted polyethylene at 160° C. The weight percent of the maleic anhydride used in each sample of the MAH grafted polyethylene is adjusted by blending DOW™ AMPLIFY™ GR205 (weight percent of MAH determined as provided herein) with the HDPE.

Wash the PET or PETG film with hexane at room temperature (23° C.) to remove any residue and/or dirt from the film forming process. Similarly, wash the MAH grafted polyethylene film with chloroform at room temperature (23° C.) to remove any residue and/or dirt from the film forming process. After washing allow the films to dry at room temperature for 12 hours.

Form the bi-layer structure for the peel test as follows. Place the MAH grafted polyethylene film over either the PET or PETG film for each of the samples, where a film of PTFE is placed as a mid-layer between the two films as a crack starter. Place each sample between two 3.125 mm steel plates and preheated each sample at 230° C. for PETG or at 270° C. for PET for 2 minutes to facilitate melting. Apply 907 kg of pressure at 270° C. on each sample for 1 minute and then rapidly quench each sample in a water-cooled compressing molding machine having a temperature of 20° C.

Figure 11:
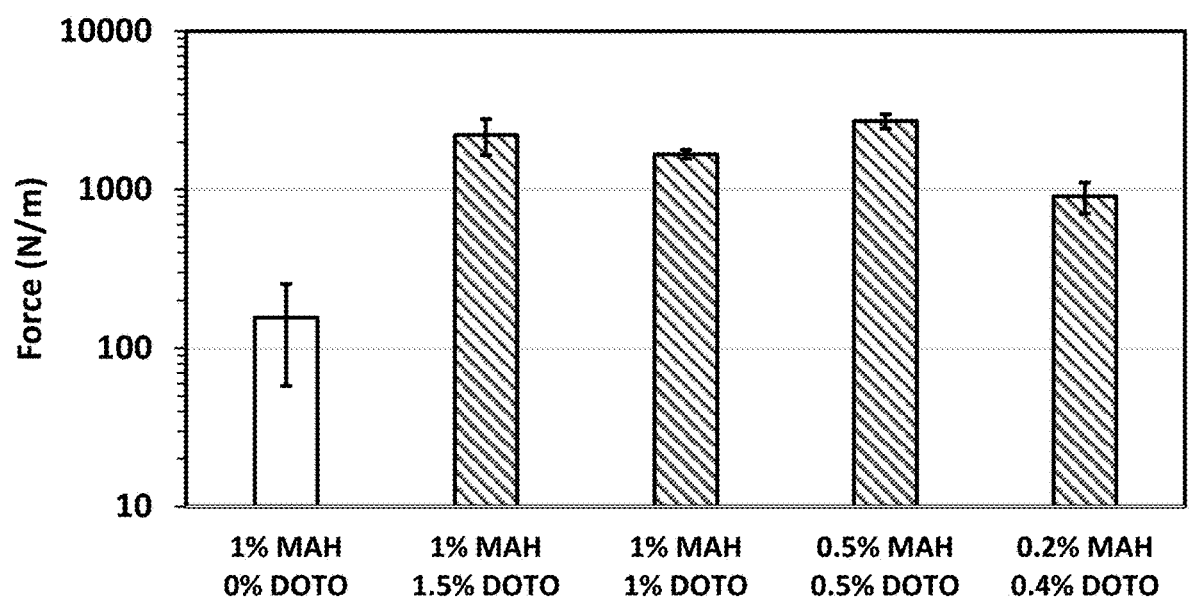
FIG. 11 provides tensile data for samples of bi-layer structure for both Comparative Examples and Examples of the present disclosure.

Once at room temperature, cut each sample of the bi-layer structure into 1.27 cm strips. Test each strip at room temperature with an Instron 5966 tensile tester at the speed of 20 mm/min. Clamp one layer of the bi-layer in each grip of the tensile tester. FIG. 11 provides a plot showing the results of the tensile tests. As seen in FIG. 11, the Comparative Examples having either no catalyst (1 wt. % MAH/0 wt. % DOTO) or very low catalyst content (0.2 wt. % MAH/0.4 wt. % DOTO) experienced interfacial failure, whereas the Examples of the resin of the present disclosure (with higher relative catalyst content—1 wt. % MAH/1.5 wt. % DOTO; 1 wt. % MAH/1.0 wt. % DOTO; 0.5 wt. % MAH/0.5 wt. % DOTO) experienced cohesive failure.

Capillary Coextrusion Process

Use a Malvern R7 Capillary rheometer with a custom-made die (described in Jordan, A. M.; Lee, P.; Thurber, C.; Macosko, C. W.; Ind. Eng. Chem. Res., 2018, Article ASAP DOI: 10.1021/acs.iecr.8b03674) to prepare samples for measuring the adhesive force between a bi-layer sample of PET and MAH grafted polyethylene (with and without catalyst as seen in FIG. 12). Set both the column temperature and the die temperature of the Malvern R7 Capillary rheometer to 275° C. To the column of the Malvern R7 Capillary rheometer, add approximately 50 grams of PET and each sample of the MAH grafted polyethylene (with and without catalyst), where the weight percent of the maleic anhydride used in each sample of the MAH grafted polyethylene is adjusted by blending DOW™ AMPLIFY™ GR205 (weight percent of MAH determined as provided herein) with the HDPE. Set the piston speed of the Malvern R7 Capillary rheometer to 45 mm/min and 20 mm/min (corresponds to 10 seconds and 22 seconds of contact time, respectively). Clamp the extrudate between two 3.125 mm aluminum plates to cool it and form a bi-layer film. The edges of the bi-layer film are trimmed with a shears to provide a clean straight edge.

Adhere the bi-layer film of each sample to a 1.59 mm thick glass slide using double-sided duct tape (Lowes: Item #156864) with the PE layer facing down the slide. Insert a #9 single-edge razor blade between the layers until delamination occurs. Measure the distance between the crack front and the end of razor blade by taking a picture (with a length standard) and using image analysis. Repeat this process three to four times to obtain an average value. Measure the width of the PET layer of the delaminated bi-layer film using a caliper. Determine the adhesion force (G) of the bi-layer film using the following equation:

$$G_c = \frac{3\Delta^2 E_1 h_1^3}{8a^4 C_1^4}$$

Where $h_1$ is the width of the PET layer, $E_1$ is the modulus of the PET, $C_1$ is $1+0.64\,(h_1/a)$, a is the crack length, and A is the thickness of the razor blade.

FIG. 13 provides a bar graph showing the adhesive force for four Comparative Examples (1 wt. % MAH/0 wt. % DOTO; 1.5 wt. % MAH/0 wt. % DOTO; 0.2 wt. % MAH/0.4 wt. % DOTO; 0.2 wt. % MAH/0.8 wt. % DOTO) and Examples of the resins of the present disclosure (0.5 wt. % MAH/0.5 wt. % DOTO; 1 wt. % MAH/0.5 wt. % DOTO; 1 wt. % MAH/0.8 wt. % DOTO; 1.5 wt. % MAH/0.4 wt. % DOTO; 1.5 wt. % MAH/0.8 wt. % DOTO). As illustrated, using a weight percentage ratio of the functional group (MAH) of the first polyolefin (polyethylene) to the tin oxide-based catalyst (DOTO) in a range from 0.25:1 to 5:1 helps to significantly improve the adhesion of the resin to PET.

We claim:

1. A resin, comprising:
   up to 99.99 weight percent (wt. %) of a first polyolefin grafted with a functional group selected from the group consisting of an ethylenically unsaturated carboxylic acid, a carboxylic acid anhydride, an ester functional group and a combination thereof; and
   0.01 to 3.0 wt. % of a tin oxide-based catalyst selected from the group consisting of dibutyltin oxide, dioctyltin oxide and combinations thereof, wherein the resin includes 0.2 wt. % to 1.5 wt. % of the functional group from the first polyolefin, wherein the wt. % is based on a total weight of the resin, wherein a weight percentage ratio of the functional group of the first polyolefin to the tin oxide-based catalyst is from 0.25:1 to 5:1.

2. The resin of claim 1, wherein the first polyolefin is selected from the group consisting of a polyethylene, a polypropylene, an ethylene/alpha-olefin copolymer, a propylene/alpha-olefin copolymer and combinations thereof.

3. The resin of claim 1, wherein the first polyolefin is a polyethylene grafted with maleic anhydride, wherein the polyethylene grafted with maleic anhydride has a grafted maleic anhydride level of 0.05 to 3.0 wt. % maleic anhydride based on the total weight of the polyethylene grafted with maleic anhydride.

4. The resin of claim 1, wherein the first polyolefin is an ethylene/alpha-olefin copolymer grafted with maleic anhydride, wherein the polyethylene grafted with maleic anhydride has a grafted maleic anhydride level of 0.05 to 3.0 wt. % maleic anhydride based on the total weight of the ethylene/alpha-olefin copolymer grafted with maleic anhydride.

5. The resin of claim 4, wherein the grafted maleic anhydride level is to 1.0 wt. % maleic anhydride.

6. The resin of claim 1, further comprising a second polyolefin having a density of 0.855 to 0.970 g/cm³, wherein the resin includes greater than 0 to 80 wt. % of the second polyolefin based on the total weight of the resin and the total weight of the first polyolefin, and the second polyolefin is different than the first polyolefin.

7. The resin of claim 6, wherein the second polyolefin is selected from a group consisting of a high-density polyethylene, a medium density polyethylene, linear low-density polyethylene, a low-density polyethylene, an ethylene/alpha-olefin copolymer having a density of 0.855 g/cm³ to 0.970 g/cm³ and combinations thereof.

8. The resin of claim 1, wherein the resin further includes 5 to 95 wt. % of a polyester based on the total weight of the resin.

9. The resin of claim 8, wherein the polyester is selected from the group consisting of polyethylene terephthalate (PET), polybutylene terephthalate (PBT), PET-glycol (PET-g), a PET copolymer, polylactic acid and combinations thereof.

10. A multilayer structure comprising at least two layers arranged in order Layer A/Layer B, wherein each of the at least two layers has a first major surface and a second major surface opposite the first major surface, wherein:
    Layer A comprises the resin of claim 1; and
    Layer B comprises a polyester, wherein a first major surface of Layer A is in adhering contact with the second major surface of Layer B.

11. The multilayer structure of claim 10, wherein the polyester of Layer B is selected from the group consisting of a film of polyethylene terephthalate (PET), polybutylene terephthalate (PBT), PET-glycol (PET-g), a PET copolymer, polylactic acid and combinations thereof.

12. A package formed with the multilayer structure of claim 10.

13. A laminate comprising the multilayer structure of claim 10.

14. The resin of claim 1, wherein the first polyolefin is a random ethylene/alpha-olefin copolymer grafted with maleic anhydride, wherein the random ethylene/alpha-olefin copolymer grafted with maleic anhydride has a grafted maleic anhydride level of 0.05 to 3.0 wt. % maleic anhydride based on the total weight of the random ethylene/alpha-olefin copolymer grafted with maleic anhydride.

15. The resin of claim 1, wherein the first polyolefin is a polyethylene grafted with maleic anhydride, wherein the polyethylene grafted with maleic anhydride has a grafted maleic anhydride level of 0.05 to 3.0 wt. % maleic anhydride based on the total weight of the polyethylene grafted with maleic anhydride, wherein the polyethylene grafted with maleic anhydride is selected from a group consisting of a high-density polyethylene, a medium density polyethylene, linear low-density polyethylene, a low-density polyethylene, an ethylene/alpha-olefin copolymer having a density of 0.855 g/cm³ to 0.970 g/cm³ and combinations thereof.

16. The resin of claim 1, wherein the tin oxide-based catalyst is dioctyltin oxide.

* * * * *